United States Patent [19]

Nakamura et al.

[11] Patent Number: 4,916,886
[45] Date of Patent: Apr. 17, 1990

[54] CUTTING LINE HEAD ASSEMBLY FOR ROTARY CUTTER

[75] Inventors: Tetsuo Nakamura; Kazuhiro Kikuchi, both of Wako, Japan

[73] Assignee: Honda Giken Kogyo Kabushiki Kaisha, Tokyo, Japan

[21] Appl. No.: 252,641

[22] Filed: Sep. 30, 1988

[30] Foreign Application Priority Data

Oct. 6, 1987 [JP] Japan .............................. 62-153912[U]

[51] Int. Cl.⁴ ............................................. A01D 34/67
[52] U.S. Cl. ........................................ 56/12.7; 30/276
[58] Field of Search ................. 56/12.7, 244, 255, 295; 172/13, 14, 15, 16, 17; 30/276, 347

[56] References Cited

U.S. PATENT DOCUMENTS 3,826,068  7/1974  Ballas et al.
4,580,394  4/1986  Baba ........................... 30/276 X
4,738,085  4/1988  Nishio et al. ..................... 56/12.7
4,790,071 12/1988  Helmig et al. ..................... 30/276

Primary Examiner—William P. Neuder
Attorney, Agent, or Firm—Lyon & Lyon

[57] ABSTRACT

A cutting line head assembly in a rotary cutter having an engine unit, and a power head having drive shaft rotatively driven by the engine unit for rotating the assembly. A housing of the assembly is connectible to the engine unit and rotatable in a cutting plane. A reel is engageable with the housing, and has a reel portion, and a peripheral wall portion separately connected to the reel portion and having at least one aperture. At least one flexible cutting line is wound on the reel portion and has a free end portion extending outwardly of the housing through the at least one aperture. A cover covers the reel in a fashion holding the reel between the housing and the cover. A coupling device couples the cover to the housing in a fashion clamping the reel securely to the housing. Urging protuberances are provided on the covering for urging the reel portion to forcibly separate the reel portion from the peripheral wall portion when the covering is coupled to the housing.

6 Claims, 3 Drawing Sheets

CUTTING LINE HEAD ASSEMBLY FOR ROTARY CUTTER

BACKGROUND OF THE INVENTION

This invention relates to an improved cutting line head assembly for rotary cutters such as rotary lawn trimmers, mowers, edgers or the like, which employs flexible non-metallic cutting lines.

A cutting line head assembly of this kind is known, e.g. from U.S. Pat. No. 3,826,068, which comprises a rotary body detachably secured to a lower end of a casing of a rotary cutter for rotation about the lower end by drive means such as a flexible cable or shaft, a plurality of spools arranged within the rotary body and wound with respective cutting lines formed of synthetic resin, and a cap attached to the rotary body, the cutting lines having free end portions outwardly extending through windows formed in the peripheral wall of the rotary body so that during rotation of the rotary body driven by the drive means the free end portions of the cutting lines revolve about the rotating rotary body to cut grass such as lawn.

According to this conventional cutting line head assembly, in mounting the assembly onto the casing, the cutting lines are previously wound onto the respective spools, the spools with the cutting lines are placed into the rotary body, and the free end portions of the cutting lines are pulled out of the rotary body through the windows. Then, the cap is attached to the rotary body to complete the assembly. The completed assembly is mounted onto the casing. In addition to these various steps, the operations of placing the spools wound with the cutting lines into the rotary body and guiding the free end portions of the cutting lines through the windows are very difficult to carry out because the gaps between the outer peripheries of the windings of cutting lines and the inner peripheral wall of the rotary body are very narrow. Moreover, these difficult operations are indispensable whenever the cutting lines become exhausted, thus rendering it difficult to supplement new cutting lines. Still further, since the cutting lines are manually wound onto the spools by the operator, the resulting windings can be uneven, which may cause unsmooth paying-out of the cutting lines.

SUMMARY OF THE INVENTION

It is an object of the invention to provide a cutting line head assembly for a rotary cutter, which enables supplementing cutting lines with easiness.

It is a further object of the invention to provide a cutting line head assembly which ensures smooth paying-out of the cutting lines.

To attain the above objects, the present invention provides a cutting line head assembly in a rotary cutter having driving means, and a power head having drive shaft means rotatively driven by said driving means for rotating said assembly, comprising:

a housing connectible to said drive shaft means and rotatable in a cutting plane by said drive shaft means;

reel means engageable with said housing, and having a reel portion, and a peripheral wall portion separably connected to said reel portion and having at least one aperture;

at least one flexible cutting line wound on said reel portion and having a free end portion extending outwardly of said housing through said at least one aperture;

covering means covering said reel means in a fashion holding said reel means between said housing and said covering means;

coupling means coupling said covering means to said housing in a fashion clamping said reel means securely to said housing; and urging means provided on said covering means for urging said reel portion to forcibly separate said reel portion from said peripheral wall portion when said covering means is coupled to said housing.

The above and other objects, features, and advantages of the invention will be more apparent from the following detailed description taken in conjunction with the accompanying drawings.

DETAILED DESCRIPTION

Figure 1:
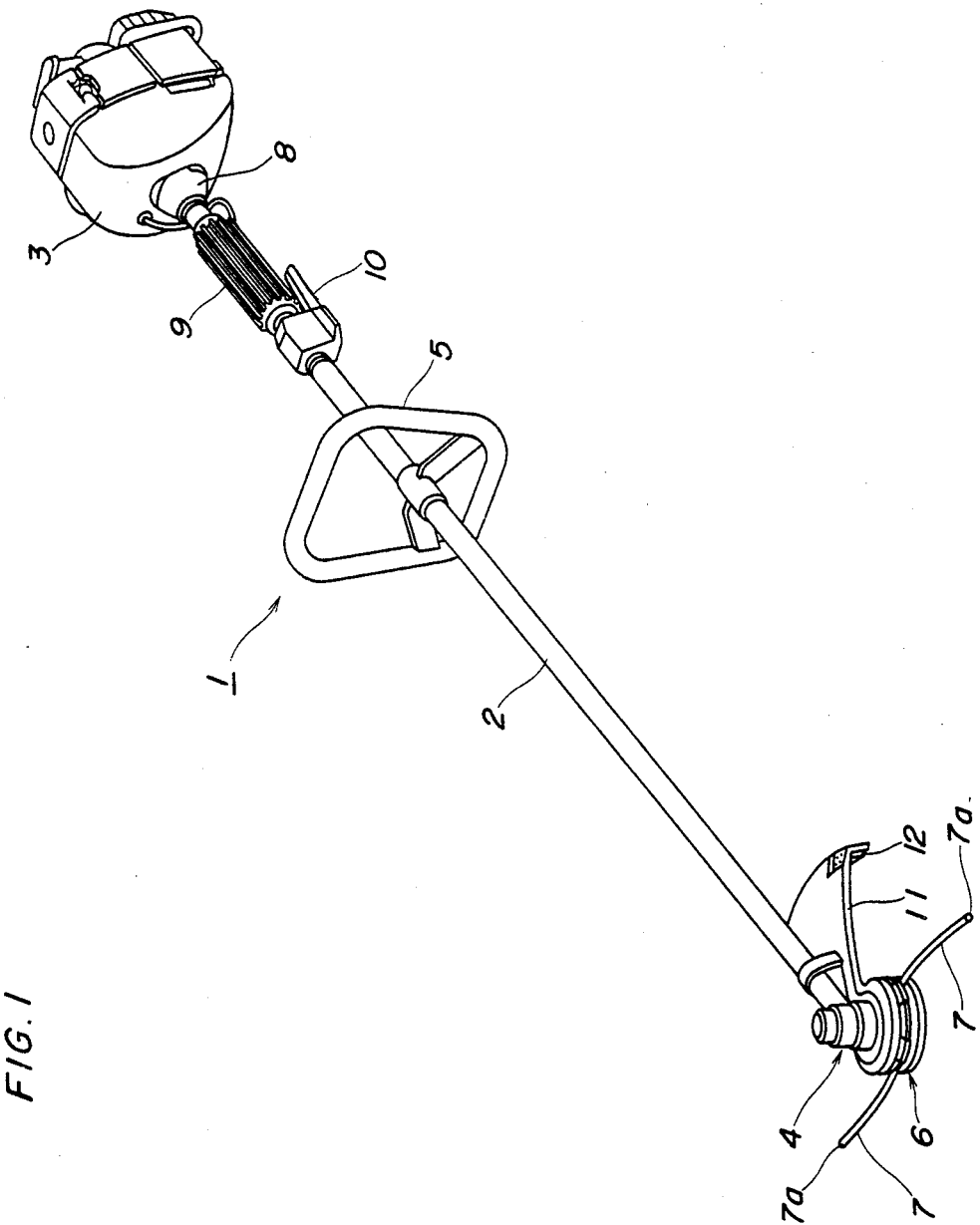
FIG. 1 is a perspective view of a trimmer as a rotary cutter, which employs a cutting line head assembly according to an embodiment of the invention.

Referring now to FIG. 1 a trimmer 1 as a rotary cutter is shown, in which is used a cutting line head assembly according to the invention. The trimmer 1 is composed of a tubular member or casing 2 having an engine unit 3 as driving means, and a power head 4 mounted at an upper end and a lower end, respectively, and having a handle 5 mounted at an intermediate portion. The cutting line head assembly 6 is mounted on the power head 4 in a manner being coupled to a drive shaft, not shown, of the head 4, which in turn is coupled to a transmission shaft, not shown, extending inside the tubular member 2. The cutting line head assembly 6 accommodates a pair of cutting lines 7, which may be formed of a synthetic resin monofilament, with free end portions extending laterally outwardly from the peripheral wall of the assembly 6. The assembly 6 is rotatable by driving power from the engine unit 3 transmitted through the transmission shaft, and drive shaft, causing revolution of the free end portions of the cutting lines 7 in a cutting plane, whereby revolving tips 7a of the line 7 cut grass, e.g., lawn.

The power head 4 is obliquely mounted on the tubular member 2 at such an angle thereto that the latter is inclined at an angle of approximately 45 degrees to the cutting plane in which the cutting lines 7 revolve. A clutch 8, a grip 9, and a throttle lever 10 are interposed between the engine unit 3 and the handle 5. A head cover 11 of a sectorial shape is secured to the power head 4 to prevent pieces of grass cut off by the tips 7a of the cutting lines 7 from being scattered toward the operator. The head cover 11 has at its periphery a downwardly pending wall, on an inner surface of which is secured a knife 12 for cutting tips 7a of the cutting lines 7 to a predetermined protrusion length.

Figure 2:
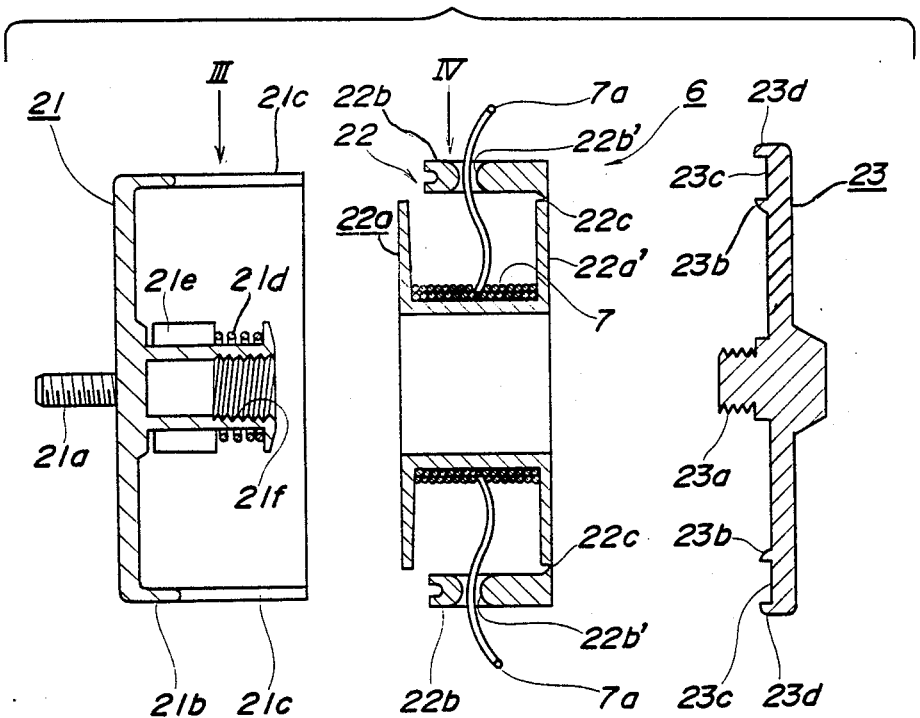
FIG. 2 is an exploded side view of a cutting line head assembly of the trimmer.

As shown in FIG. 2, the cutting line head assembly 6 is composed of a generally cylindrical head body or housing 21 coupled to the drive shaft in the power head 4 and having an open end remote from the latter, a cutting line reel 22 detachably mounted within the head body 21 and having a reel portion 22a wound with a pair of cutting lines 7, and a reel cover 23 threadedly fitted in the head body 21 in a fashion covering a radially extending bottom wall 22a' of the reel portion 22a remote from the head body 21. The two cutting lines 7 are wounded on the reel portion 22a in such a manner that they do not overlap each other but are axially arranged side by side and they are wound in the same direction, i.e. in a direction opposite to the direction of rotation of the reel 22.

Figure 3:
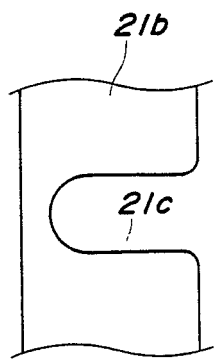
FIG. 3 is a view as viewed in the direction of the arrow III in FIG. 2.

As shown in FIGS. 2 and 3, a threaded shaft 21a is secured to an end wall of the head body 21 facing toward the power head 4, for threaded engagement with the drive shaft in the power head 4. The head body 21 has a peripheral wall 21b formed therein with a pair of engaging openings 21c and 21c at diametrically opposite locations, opening in an open end edge of the head body 21 remote from the power head 4. The head body 21 has a central hub 21d extending integrally from the end wall toward the open end, on which is mounted a cutting line pay-out device 21e of a conventional type which pays out the cutting lines 7 by a predetermined length whenever the head assembly 6 is softly struck or datted on the ground. The central hub 21d has a tapped bore 21f formed therein.

Figure 4:
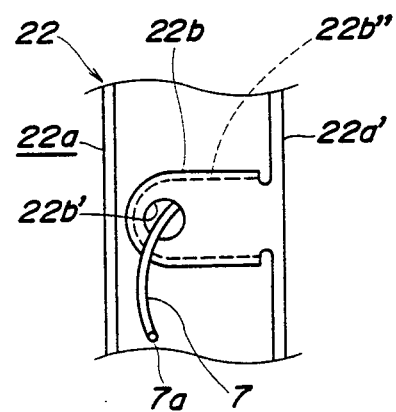
FIG. 4 is a view as viewed in the direction of the arrow IV in FIG. 2.

As shown in FIGS. 2 and 4, the cutting line reel 22 has two peripheral walls 22b and 22b formed integrally with the bottom wall 22a' of the reel portion 22a at diametrically opposite locations and corresponding in shape to the engaging opening 21c of the head body 21. Each of the peripheral walls 22b, 22b has a line exit hole 22b' formed therein at an intermediate portion, and a peripheral engaging groove 22b'' at a peripheral edge thereof. A pair of fragile portions 22c and 22c are each provided at the juncture between each of the peripheral walls 22b and the bottom wall 22a' in a manner circumferentially extending over the whole width of the bottom wall 22a'. The fragile portions 22c and 22c may be formed by an elongate thinned wall or by an elongate cut or indentation.

The cutting line reel 22 constructed as above is previously assembled for use like a cartridge, before use in the cutting line head assembly, with two cutting lines 7 wound on the reel portion 22a in a fashion having one ends thereof secured to the reel portion and the free end portions passing through the line exit holes 22b' to the outside.

As best shown in FIG. 2, the reel cover 23 has an inner end face thereof formed integrally with a central threaded protuberance 23a to be threadedly fitted in the tapped bore 21f of the head body 21, and a pair of urging protuberances 23b and 23b adapted to urge the bottom wall 22a' of the reel portion 22a to forcibly sever the bottom wall 22a' from the peripheral walls 22b along the fragile portions 22c, 22c when the reel cover 23 is threadedly coupled to the head body 21, and a pair of engaging grooves 23c and 23c defined by axial flanges 23d and 23d extending integrally from the peripheral edge and the urging protuberances 23b, 23b for engagement with opposed ends of the peripheral walls 22b, 22b after the latter are severed from the bottom wall 22a'.

The manner of assembling the cutting line head assembly 6 will now be described with reference to FIGS. 5 and 6.

Figure 5:
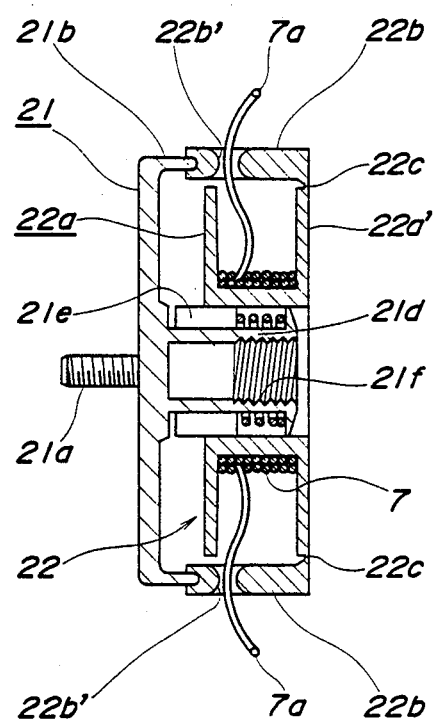
FIG. 5 is a longitudinal cross-sectional view of a body and a cutting line reel of the assembly in an assembled state.

The cartridge-type cutting line reel 22, in which the cutting lines 7 are wound on the reel portion 22a with the free end portions passing to the outside through the line exit holes 22b as shown in FIG. 2, is mounted onto the head body 21 as shown in FIG. 5, by mating the engaging grooves 22b'' (FIG. 4) of the peripheral walls 22b of the reel 22 with peripheral edges of the engaging openings 21c (FIG. 3) of the head body 21.

Figure 6:
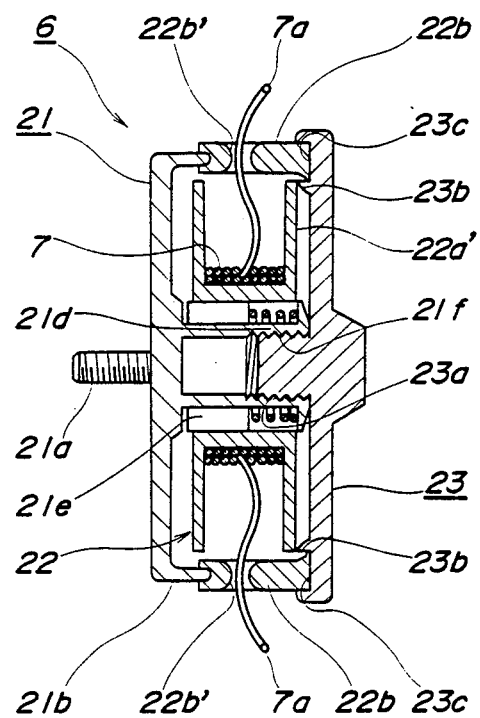
FIG. 6 is a longitudinal cross-sectional view of the completed assembly.

Then, as shown in FIG. 6, the reel cover 23 is joined to the head body 21 through the cutting line reel 22, by screwing the central threaded protuberance 23a of the reel cover 23 into the tapped bore 21f of the head body 21. On this occasion, the urging protuberances 23b, 23b of the reel cover 23 push the bottom wall 22a' of the reel 22 to cause the bottom wall 22a' and the peripheral walls 22b, 22b to be separated from each other along the fragile portions 22c, 22c. Thus assemblage of the cutting line head assembly 6 is completed, wherein the reel 22 is held between the head body 21 and the reel cover 23 in a manner being clamped to the head body 21 by means of the threaded engagement of the hub 21d and the protuberance 23a. Upon completion of the assemblage, the line pay-out device 21e and the reel portion 22a separated from the peripheral walls 22b become automatically operatively coupled together.

Following the assemblage of the head assembly 6, the threaded shaft 21a of the head body 21 is screwed into the drive shaft in the power head 4, thus mounting the head assembly 6 onto the power head 4.

After the mounting of the head assembly 6 onto the power head 4, if the engine unit 3 is started, driving power from the unit 3 is transmitted through the clutch 8, the transmission shaft in the tubular member 2, and the drive shaft in the power head 4 to the head body 21 of the head assembly 6. Then, the driving power is transmitted from the head body 21 to the reel portion 22a through the line pay-out device 21e, whereby the reel portion 22a and accordingly the cutting lines 7 rotate together with the head body 21, to thereby cause revolution of the free end portions of cutting lines to cut grass or the like with their tips 7a.

When the protrusion length of the cutting lines 7 is reduced with use, the cover 23 is patted upon the ground at its lower surface in order to pay out the cutting lines 7 by a predetermined length. The patting causes temporary release of the line pay-out device 21e and the reel portion 22a from the coupling therebetween so that the cutting lines 7 are paid out by the predetermined length.

Although in the foregoing embodiment the peripheral walls 22b and bottom wall 22a' of the cutting line reel 22 are formed in a one-piece body with the fragile portions 22c interposed therebetween, this is not limitative to the invention. Alternatively, the peripheral walls 22b and the bottom wall 22a' may be formed in separate bodies and then bonded together with such bond strength that when the reel cover 23 is threadedly engaged with the head body 21, they can easily be separated from each other by the urging force of the urging protuberances 23b.

Further, although in the foregoing embodiment two diametrically opposite peripheral walls 22b, 22b are provided, a single such wall may alternatively be provided extending along the whole circumference of the cutting line reel 22 and accordingly a single annular fragile portion and a single annular urging protuberance may be provided, for example.

The number of the cutting lines 7 is not limited to two, but it may be one or three or more.

What is claimed is:

1. A cutting line head assembly in a rotary cutter having driving means, and a power head having drive shaft means rotatively driven by said driving means for rotating said assembly, comprising:
    a housing connectible to said drive shaft means and rotatable in a cutting plane by said drive shaft means;
    reel means engageable with said housing, and having a reel portion, and a peripheral wall portion separably connected to said reel portion and having at least one aperture;
    at least one flexible cutting line wound on said reel portion and having a free end portion extending outwardly of said housing through said at least one aperture;
    covering means covering said reel means in a fashion holding said reel means between said housing and said covering means;
    coupling means coupling said covering means to said housing in a fashion clamping said reel means securely to said housing; and
    urging means provided on said covering means for urging said reel portion to forcibly separate said reel portion from said peripheral wall portion when said covering means is coupled to said housing.

2. A cutting line head assembly as claimed in claim 1, wherein said reel means includes a fragile portion connecting between said reel portion and said peripheral wall portion, along which said reel portion is forcibly separated from said peripheral wall portion by said urging means.

3. A cutting line head assembly as claimed in claim 1 or claim 2, wherein said covering means has an end face facing said reel portion, said urging means comprising at least one protuberance formed on said end face.

4. A cutting line head assembly as claimed in claim 1 or claim 2, wherein said housing has an end wall connectible to said drive shaft means, said covering means having an end face facing said reel means, said coupling means comprising a central hub extending from said end wall toward said covering means and having a tapped bore formed therein, and a threaded protuberance extending from said end face and threadedly engaged in said tapped bore.

5. A cutting line head assembly as claimed in claim 1 or claim 2, including engaging means engaging said reel means with said housing, said housing having a peripheral wall, and an open end face facing toward said reel means, said engaging means comprising at least one opening formed in said peripheral wall of said housing, and terminating in said open end face of said housing, said at least one opening having a peripheral edge, at least one peripheral wall forming said peripheral wall portion of said reel means and corresponding in shape to said at least one opening, said at least one peripheral wall having a peripheral edge, and at least one peripheral groove formed in said at least one peripheral wall at said peripheral edge, said at least one peripheral wall being fitted in said at least one opening in a manner such that said at least one peripheral groove mates with said peripheral edge of said at least one opening.

6. A reel-cutting line assembly for use in a cutting line head assembly in a rotary cutter having driving means, a power head having drive shaft means rotatively driven by said driving means for rotating said assembly, a housing connectible to said drive shaft means and rotatable in a cutting plane by said drive shaft means, covering means joined to said housing in a manner for holding said reel-cutting line assembly between said housing and said covering means, and urging means provided on said covering means, said reel-cutting line assembly comprising:
    reel means engageable with said housing, and having a reel portion, and a peripheral wall portion separably connected to said reel portion and having at least one aperture, said reel means including a fragile portion connecting between said reel portion and sid peripheral wall portion, along which said reel portion is forcibly separated from said peripheral wall portion by said urging means when said covering means is coupled to said housing; and
    at least one flexible cutting line wound on said reel portion and having a free end portion extending outwardly of said housing through said at least one aperture.

* * * * *